Patented Feb. 24, 1942

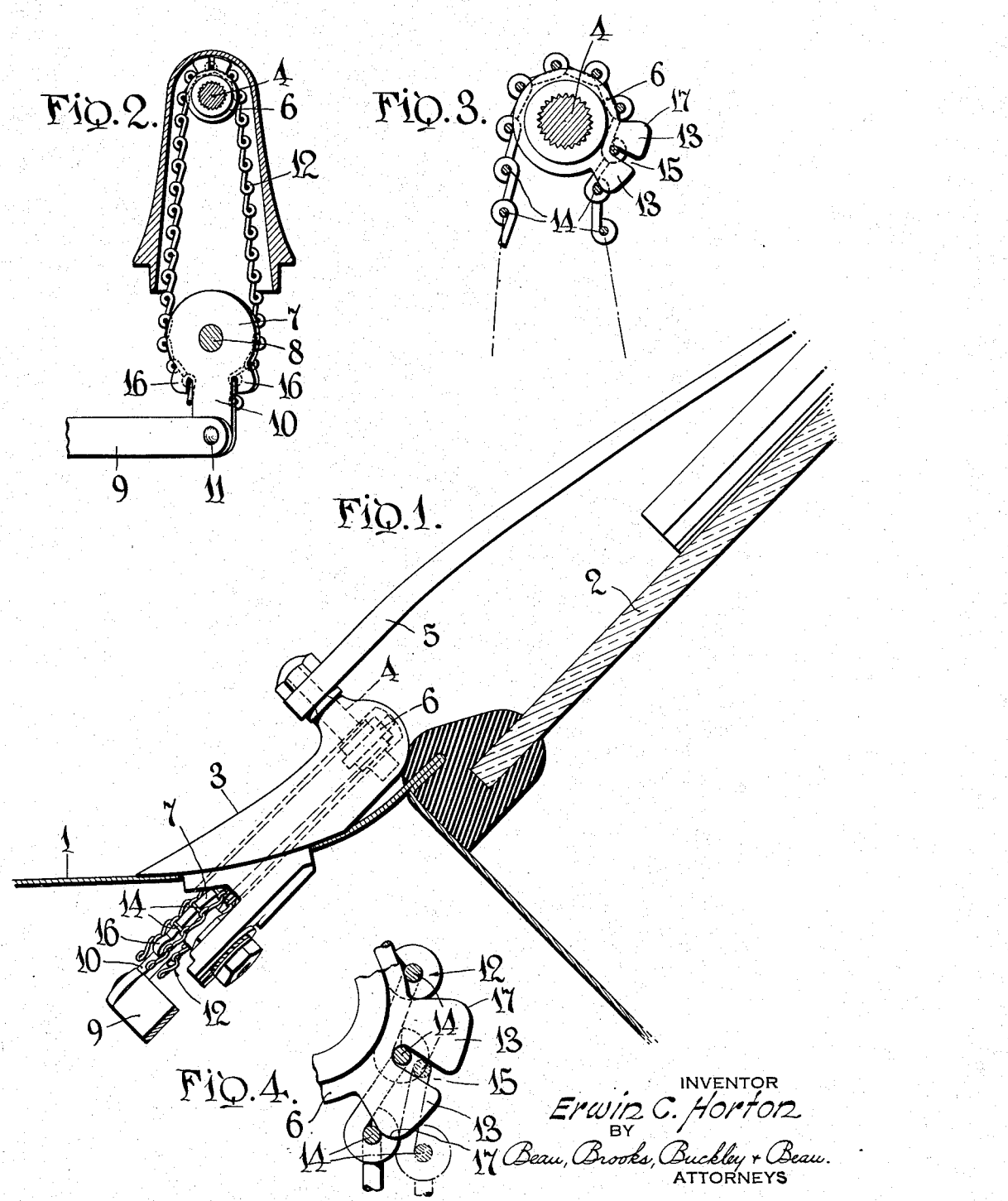

2,274,295

UNITED STATES PATENT OFFICE 2,274,295

FLEXIBLE TRANSMISSION

Erwin C. Horton, Hamburg, N. Y., assignor to Trico Products Corporation, Buffalo, N. Y.

Application August 3, 1939, Serial No. 288,196

6 Claims. (Cl. 74—222)

This invention relates to a windshield cleaner and more particularly to the chain gear drive therefor.

The modern motor vehicle has its windshield wiper operable through a flexible transmission which facilitates the installation of the cleaner on a motor vehicle and which embodies a unit having a wiper shaft and a driving shaft therefor and connected thereto by chain sections engaging projections on the shafts. If the chains become dislodged or engaged with the wrong projection the wiper will likewise become displaced. Further, the shaft cannot with safety be oscillated in excess of 180° without upsetting the intended operation.

It is an object of the present invention to provide a practical construction of chain gear in which the factory determined relation between the parts is secured against accidental derangement. Further, the invention aims to provide a practical construction in which the chain portion or portions may be readily engaged and disengaged in an authorized manner.

In the accompanying drawing

Fig. 1 is a fragmentary sectional view of a motor vehicle having a windshield cleaner installed thereon;

Fig. 2 is a longitudinal sectional view through the chain gear housing;

Fig. 3 is a detailed enlargement of the chain gear more clearly depicting the present invention, and Fig. 4 is an enlarged detailed view more clearly showing the manner of engaging and disengaging the chain.

Referring more particularly to the drawing, the numeral 1 designates the cowl portion of the motor vehicle extending forwardly from the base of the windshield 2. Disposed within an opening in the cowl is a housing 3 serving as a support for the wiper shaft 4, as well as an enclosure for the chain gear. Fixed on the wiper shaft 4 is the wiper carrying arm 5, to the free upper end of which is connected the wiper, not shown.

The chain gear comprises a pair of wheels or mutilated sprockets 6 and 7, the wheel 6 being fixed to the wiper shaft 4, while the wheel 7 is fixed to a driving shaft 8, suitably journaled on a bracket portion of the housing 3 beneath the cowl I for deriving its power from a suitable source to which it is connected by a link 9. The shaft 8 is shown as being angularly displaced with respect to the shaft 4 of which the chain transmission readily admits to facilitate the installation on angular windshields. The wheel 7 is depicted as having a radial arm 10 to which the link 9 is pivotally connected, as at 11, so that when the link is reciprocated the wheel 7 will be oscillated about its axis. The two wheels are operatively connected by a chain 12 so that when the lower wheel 7 is oscillated a similar movement will be transmitted to the wiper operating shaft 4.

The upper wheel 6 has one or more teeth 13, each being peculiarly shaped by broadening out with a flare from its base so that both the front and back edges of the tooth lie substantially radial. The circumferential length of the crest or top of each tooth, while being less than the longitudinal dimension of the opening in the engaged link of the chain, or the distance between adjacent cross bars 14 of the chain, is greater than its basal dimension. The tooth is, however, dimensioned so as to have a greater distance between its trailing base edge and its advancing outer edge than the distance between adjoining cross bars of the chain. Consequently, with the rear cross bar of a link hugging the wheel at the base of the tooth it will be impossible for the link to swing its front cross bar over such leading outer edge and clear of the tooth. Therefore, the chain will follow under the wheel substantially as depicted in Fig. 3.

The action of the chain being such that the front cross bar of the engaged link tends to swing outwardly about the pivotal axis of the next succeeding cross bar but is prevented because this radius is less than the extreme dimension of the tooth from its base, the link will be prevented from detaching itself from the tooth while under the pulling stress from the lower wheel 7. Where two teeth are provided on the sprocket 6, the opposing radial sides of the teeth, defining the slot 15, may be constructed parallel to each other as well as to the radius passing therebetween. The remote edges of the two teeth preferably are radial, terminating outwardly in arcs 17 over which the adjacent cross bar may pass when the intermediate or trailing cross bar has first been manually lifted outwardly away from the wheel.

Consequently, the link will be prevented from accidental disengagement, but nevertheless permit authorized disengagement by bodily movement of the link radially of the tooth for a distance prior to swinging the forward bar over the corner 17. As shown in Fig. 3, the right hand flight of the chain is pulling downwardly on the wheel 6 so that the front cross bar of the first engaged link is held in engagement with the front edge of the tooth, while the adjacent cross bar within the slot 15 is confined toward the base of the tooth by the trailing portion of the chain which hugs close to the wheel as it takes over the upper arc thereof. When the wheel is oscillated in the opposite direction a similar action will take place regarding the other tooth which then will be the advancing one in that particular instance.

The opposite or lower ends of the chain are engaged with teeth 16, similarly shaped as teeth 13, on opposite sides of the radial arm 10 whereby the chain will be held from becoming disengaged when the slack flight is elevated above the horizontal.

It is, therefore, obvious that the chain may readily be engaged with and disengaged from the teeth when desired for purposes of replacement or repair, but during operation the chain is securely interlocked against accidental disengagement. The flaring shape of the tooth gives a diagonal dimension greater than the link opening to thereby insure this.

The foregoing disclosure is illustrative of the inventive concept herein disclosed, which latter may be incorporated in other physical embodiments without departing from the scope or spirit of the invention claimed.

What is claimed is:

1. A flexible transmission of the character described, comprising a chain gear in which a wheel has a tooth engaged by a chain link and flaring from the base in the plane of rotation with a point on the leading edge at a substantial distance from its base being spaced from the base of the trailing edge of the tooth a distance greater than the length of the link opening, whereby on pivotal movement of the front end of the link away from the sprocket hub and about the back end as a point of fulcrum said front end will be obstructed by the tooth from passing freely thereover.

2. A chain gear of the character described having a wheel with a chain anchoring tooth the crest portion of which is enlarged circumferentially, and a link having front and rear cross portions defining a tooth receiving opening and engageable with the front and back edges of the tooth upon the outward swinging of the front cross portion, the longitudinal dimension of the link opening being greater than the circumferential dimension of the enlarged crest portion to permit manual placement of the link thereover, such dimension of the link opening being shorter than the distance between the leading corner of the crest portion and the basal point of engagement of the rear cross portion with the back face of the tooth.

3. A chain gear having a wheel with a chain anchoring tooth flaring outwardly in a radial direction, and a chain link with a tooth receiving opening, the outer circumferential dimension of the tooth being substantially equal to the length of the link opening to permit reception of the tooth by the opening when the link is moved bodily over the tooth, and a point on the leading edge at a substantial distance from its base being spaced from the base of the trailing edge a distance greater than the length of the link opening whereby to prevent disengagement of the link from the tooth during pivotal movement of the link about an axis at the base of the trailing edge.

4. A chain gear having a wheel with a chain anchoring tooth flaring outwardly in a radial direction, and a chain link with a tooth receiving opening, the outer circumferential dimension of the tooth being substantially equal to the length of the link opening to permit reception of the tooth by the opening when the link is moved bodily over the tooth, and a point on the leading edge at a substantial distance from its base being spaced from the base at the trailing edge a distance greater than the length of the link opening to prevent one end of the link being lifted from off the tooth by pivotal movement about an axis adjacent the base of the trailing edge of the tooth, the transverse outer corner of the tooth at the leading edge being rounded.

5. A chain engaging tooth of outwardly flaring design to provide a greater circumferential dimension adjacent the top of the tooth than at the base thereof, a diagonal dimension of the tooth being greater than its circumferential dimension, and a chain link having a tooth receiving opening with a longitudinal dimension greater than the circumferential dimension and less than the diagonal dimension.

6. A flexible transmission comprising a chain gear in which a wheel is provided with a link anchoring tooth, and a chain link engaging the tooth, the tooth having a maximum circumferential dimension less than the spacing between the forward and rearward cross portions of the link and a diagonal dimension between a point on the leading edge of the tooth at a substantial distance from its base and the base of the trailing edge of the tooth being greater than such spacing between the link cross portions whereby to prevent disengagement of the link from the tooth during pivotal movement of the link about an axis at the base of the trailing edge.

ERWIN C. HORTON.